United States Patent Office
3,549,352
Patented Dec. 22, 1970

3,549,352
STAGED FLUIDIZED IRON ORE REDUCTION PROCESS
Francis X. Mayer, Baton Rouge, La., assignor to Esso Research and Engineering Company, a corporation of Delaware
No Drawing. Filed Sept. 18, 1967, Ser. No. 668,657
The portion of the term of the patent subsequent to July 16, 1985, has been disclaimed
Int. Cl. C22b 1/10, 5/14
U.S. Cl. 75—26                                6 Claims

ABSTRACT OF THE DISCLOSURE

In staged fluidized iron ore reduction processes, fouling and bogging in ferrous reduction stages can be substantially suppressed by adding to the ferrous reduction stages small amounts of oxides or carbonates of calcium or magnesium as antibogging agents. The antibogging agent particle sizes range no more than about 10 microns in diameter.

---

This invention relates to a process for the production of metallic iron by reduction of particulate iron ores in a series of staged fluidized beds. In particular, it relates to new and improved techniques for suppression of reactor fouling and bogging in such processes, particularly in the ferrous reduction stage, or stages. Pursuant to this invention, it has been found that fouling and bogging of reactor surfaces can be suppressed by addition of small and infinitesimal quantities of extremely finely divided oxides of alkaline earth metals, e.g., calcium or magnesium, or both, added to or injected directly into the ferrous reduction stage, or stages. The added particles range no more than about 10 microns, and finer, in particle diameter, and preferably no more than from about 1 to about 2 microns, and finer, for optimum effectiveness. In addition, the particles range no more in average size than from about $\frac{1}{100}$ to about $\frac{1}{10}$, and preferably from about $\frac{1}{100}$ to about $\frac{1}{50}$, of the average particle size of the ore. The additives adhere to the relatively large ore particles, suppressing their normal stickiness thereby drastically minimizing reactor fouling and bogging. This improvement permits operation of the process at high hydrogen concentration and at temperatures ranging from about 200° F. to about 300° F. higher in the ferrous reduction stages than is attainable without the use of the additives.

In advanced direct iron ore reduction processes, particulate iron ores, e.g., oxidic iron ores which consist essentially of iron oxides, are staged in a series of beds, directly contacted and fluidized by ascending gases, e.g., carbon monoxide and hydrogen, or both, and progressively reduced. The ore is flowed downwardly from one bed of the series to the next succeeding bed. Typically, the ore is reduced in an initial bed, or beds, from, e.g., ferric oxide to magnetite (magnetic oxide of iron). It is reduced in a succeeding bed, or beds, from magnetite (or mixture approximating the magnetite formula) to ferrous oxide and, finally, in another bed, or beds, from ferrous oxide to substantially metallic iron.

For high efficiencies it is essential to operate the individual stages at relatively high temperatures, in both the ferric and ferrous reduction stages. This, however, is rarely practical, particularly when processing certain types of ores, e.g., specular hematite ores. This is due to the phenomenon of bogging, an acute difficulty associated with such processes. It is manifested by a stickiness of the particles, particularly in the ferrous reduction stages. In bogging, the surfaces of the individual ore particles, particularly those ranging about 200 mesh (Taylor Series), and finer often become coverd, in whole or in part, with microscopic sized nodules or crystalline forms of very pure iron. These often project outwardly and grow from active sites within the particles. The nodules of individual particles touch together and attach by welding to form aggregates or agglomerates. Bogging intensifies with increasing temperature and metallization, and the problem can be quite severe.

In continuous operation, reactor fouling is also significant, and a major source of difficulty. Deposits are formed on reactor surfaces and auxiliary equipment. Grids and cyclone separators, for example, are particularly susceptible to such fouling. The deposits vary from soft to very hard agglomerates. In either instance, they interfere with proper operation by obstructing the flow of gases and solids.

Study has been made of these agglomerates, and it has been found that these consist largely of iron oxides, metallic iron, and cementite. The soft deposits are porous and fine grained with the metallic component highly dispersed in the oxide matrix. The hardscale deposits, which cause the greater difficulties, are layered structures containing relatively high concentrations of cementite. Whatever the chemical make-up that promotes the formation of these agglomerates, however, it has been found that the deposits are formed by extremely small particles which are entrained in the gas and "hammer-welded" onto surfaces adjacent to the openings through which the gases are passed. Moreover, it has been found that the preponderance of the particles which produce the adverse effects range in size up to about 10 microns, and finer. In fact, the major portion of the particles ranges in size from about 1 to 2 microns, and finer. Whatever the theory of mechanism, however, these small particles drastically impair the operation of the process. Frequent shutdowns are necessitated to dislodge deposits. The hard agglomerates are difficult to remove, sometimes resulting in damage to equipment. The formation of deposits within, e.g., the grids and cyclone separators of the ferrous reduction stage, or stages, is particularly acute due to the extreme "stickiness" of the partially metallized particles within this stage, or stages.

The present invention contemplates the use of micron and submicron sized agents or compounds selected from alkaline earth metal oxides or carbonates, especially the oxides of calcium and magnesium, or both, alone or in admixture with other compounds. By injection of small and infinitesimal quantities of such compounds directly into the ferrous reduction stage, or stages, bogging and reactor fouling are drastically suppressed. Suitably from about 0.1 to about 1.0 percent, and preferably from about 0.3 to about 0.7 percent, based on the weight of the ore, of the dry powder is effective in suppressing the tendency of the ore to bog or foul the reactor, or both. Bogging will not occur at holding times ranging from about 0.5 hour to about 4 hours, and particularly within from about 1 hour to about 2 hours, even when operating at temperatures ranging from about 200° F. to about 300° F. above the temperature previously attainable in the ferrous reduction stages without the use of the additives.

Preferably, for effectively preventing fouling, as well as bogging, the particle size distribution of the additive ranges from about $\frac{1}{100}$ to about $\frac{1}{10}$, and preferably from about $\frac{1}{100}$ to about $\frac{1}{50}$ of the average particle size distribution of the iron ore solids. In absolute particle size distribution, the additive particles should range no larger than about 10 microns, and preferably from about 1 to about 2 microns, and smaller. Sufficient of the additive is added to shield and prevent contact, and preferably to coat, the partially metallized particles of ore, particularly the very minute sized particles ranging below about 10 microns in particle size diameter. While larger amounts of additive than specified can be added to suppress fouling and bogging, this is not necessary so long as sufficient of the additive has been added to coat the smallest of the iron ore particles.

Surprisingly, it has thus been found that fouling and bogging can be effectively suppressed by incorporation, with the ore, of very small amounts of ultra small sized additive particles—viz., additives measuring down in the micron and sub micron range. It is believed these small particles adhere to the active sites on the reduced particle, even more effectively as the stickiness of the particle increases, this eliminating or lessening the possibility of contact between the active sites of different particles. It has been found that the extremely small ore solids particles, especially the highly reduced ore solids particles, are basically responsible for creation of these adverse effects and, therefore, ultra small sized particles of additive are required for most effective suppression.

In a preferred embodiment, oxidic iron ores are contacted with ascending hydrogen-containing gases, and additive is added, as dry powder, directly to a ferrous reduction stage, or stages, to permit operation of these stages at temperatures ranging from about 200° F. to about 300° F. higher than attainable without the use of such additives. In other words, by use of the ultra small additive particles, the process can be operated at temperatures ranging as high as 200 to about 300 Fahrenheit degrees above the normal bogging temperature of the ore. Magnesium oxide, or mixtures which contain magnesium oxide or are capable of generating this oxide in situ, has been found particularly effective. Magnesium oxide has proven outstanding as an additive pursuant to the present invention, and is at least about ten times more effective than other alkaline earth metal oxides and carbonates.

The following nonlimiting examples and demonstrations bring out the more salient features and provide a better understanding of the invention.

A specular hematite ore is pulverized in an impact mill to particle sizes ranging from about 70 to about 210 microns (70–200 mesh), and divided into like portions.

A portion of the ore is preheated and charged into the top stage of a fluidized iron ore reactor provided with a series of four staged fluidized beds, two ferric reduction beds and two ferrous reduction beds. The ore pours downwardly from one bed to the next of the series, and is fluidized by an upwardly flowing gas initially 60 percent hydrogen and 40 percent nitrogen. Gas at elevated temperature ascends from a bed containing an iron ore at a lower state of oxidation to a bed containing ore at a higher state of oxidation, i.e., from the bottom to the top of the reactor. In the top ferric reduction stage, the partially oxidized gas is burned with air to provide heat for the various reduction stages. The ferric reduction stages, wherein ferric oxides are reduced essentially to magnetic oxide and thence to ferrous oxide of iron, are operated at 1300° F. as are the ferrous reduction stages wherein the ferrous oxide is reduced, in the final stage, to provide 94 percent metallization.

Pursuant to operating at such conditions, the ferrous reduction beds showed signs of bogging within about 10 minutes and are severely and totally bogged in only 20 minutes of continuous operation.

EXAMPLE 1

The foregoing run is repeated employing the second portion of the ore except in this instance 0.5 percent of magnesium oxide powder, based on the weight of iron ore feed, and ground to a particle size distribution, about 95 percent of which ranges from 1 micron, and finer, to 10 microns, and charged into the ferrous reduction stages. At the end of a 24-hour period, when the test is arbitrarily terminated, there is not the slightest evidence of bogging or of any tendency towards bogging. The beds appear normal and the process functions normally in every way. Moreover, there is no evidence of any deposits within the grid openings or cyclone separators of the reactor.

EXAMPLE 2

Then the foregoing is repeated using calcium oxide in 1 percent concentration, similar results are obtained.

To further demonstrate the effectiveness of the ultra small additive particle sizes, reference is made to the following table which gives comparative examples of data obtained by adding magnesium oxide or magnesium carbonate to a ferrous reduction bed, operated at 1600° F., and formed by contact with reducing gas consisting essentially of 60 percent hydrogen and 40 percent nitrogen. The iron ore is 90 percent metallized when introduced into the bed, and the additive is constantly maintained at a level of 0.5 percent, based on the weight of the iron ore. The particle size distribution of the reduced ore ranges from about 4 to about 325 mesh (Taylor Series).

In the tests, the time of introduction of the ore into the bed is time zero, and the span between this and the time of bogging, in minutes, is measured and recorded at Colum 5 as bogging time. The particle sizes of the additive, determined by X-ray diffraction, is given in microns. In Column 3 is given the particle size distribution or total range of particle sizes, and in Column 4 is given the major particle size distribution, or maximum sizes of 90 percent of the particles.

| Example No. | Additive | Particle size distribution, microns | Major particle size distribution, microns | Bogging time, minutes |
|---|---|---|---|---|
| 3 | MgCO₃ | 1–40 | 25 | 31 |
| 4 | MgCO₃ | 1–10 | 2 | 300+ |
| 5 | MgO | 1–3 | 2 | 345+ |

By comparison of Examples 3 and 4 in the above tables, it will be seen that the smaller particle sizes are considerably more effective in suppressing bogging than the relatively larger particle sizes. Thus, in Example 3, bogging occurs in 31 minutes whereas in Example 4 bogging has not occurred, even at the end of 5 hours, when the test is arbitrarily terminated. Moreover, in Example 5, bogging has not occurred even at the end of 5¾ hours, when the test is arbitrarily terminated.

In the tests there is no evidence of grid or cyclone fouling.

Even more effective suppression of fouling and bogging is obtained when the particle size distribution of the additives ranges below 1 micron.

Having thus described the invention, what is claimed is:

1. In a process for the production of metallic iron from oxidic iron ores wherein the iron ore in particulate form is fed into the process and fluidized within a series of beds by contact with a stream of hydrogen-containing gas, and reduced, at elevated temperatures, the improvement comprising adding directly to a ferrous reduction bed, a dry powder compound selected from the group consisting of alkaline earth metal oxides, carbonates, mixtures thereof and compounds capable of generating in situ said oxides and mixtures thereof, of particle size ranging from about 1 to about 10 microns and finer, in effective concentration ranging from about 0.1 to about 1.0 percent, based on the total weight of the ore, maintaining a temperature ranging from about 1300° F. to about 1600° F., said temperature being above and ranging up to about 300 Fahrenheit degrees above the normal bogging temperature of the reduced ore.

2. The process of claim 1 wherein the major proportion of the additives range in particle sizes from about 1 to about 2 microns, and finer.

3. The process of claim 1 wherein the compound is added in quantities ranging from about 0.3 to about 0.7 percent, based on the weight of the ore feed.

4. The process of claim 1 wherein there is provided a series of ferrous reduction stages, and the reducing gas contains up to about 60 percent hydrogen.

5. The process of claim 1 wherein the alkaline earth metal is magnesium.

6. The process of claim 1 wherein the alkaline earth metal is calcium.

References Cited

UNITED STATES PATENTS

| | | | |
|---|---|---|---|
| 2,758,021 | 8/1956 | Drapeau, Jr. | 75—26X |
| 2,831,759 | 4/1958 | Osborn | 75—26 |
| 2,871,115 | 1/1959 | Agarwal | 75—26X |
| 3,020,149 | 2/1962 | Old et al. | 75—26 |
| 3,062,639 | 11/1962 | Sterling | 75—26 |
| 3,246,978 | 4/1966 | Porter, Jr., et al. | 75—26 |
| 3,341,322 | 9/1967 | Bailey | 75—26 |
| 3,393,066 | 7/1968 | Mayer | 75—26 |
| 3,428,446 | 2/1969 | Locke, Jr. | 75—26 |

ALLEN B. CURTIS, Primary Examiner